US010215118B2

(12) United States Patent
Ohmura et al.

(10) Patent No.: US 10,215,118 B2
(45) Date of Patent: Feb. 26, 2019

(54) CONTROL DEVICE AND CONTROL METHOD FOR HYBRID DRIVE VEHICLE

(71) Applicant: NISSAN MOTOR CO., LTD., Yokohama-shi, Kanagawa (JP)

(72) Inventors: Yasushi Ohmura, Tokyo (JP); Hiroshi Arakawa, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 574 days.

(21) Appl. No.: 14/372,869

(22) PCT Filed: Jan. 17, 2013

(86) PCT No.: PCT/JP2013/050750
§ 371 (c)(1),
(2) Date: Jul. 17, 2014

(87) PCT Pub. No.: WO2013/108812
PCT Pub. Date: Jul. 25, 2013

(65) Prior Publication Data
US 2015/0239463 A1    Aug. 27, 2015

(30) Foreign Application Priority Data
Jan. 19, 2012 (JP) ................................. 2012-009009

(51) Int. Cl.
*B60W 20/16* (2016.01)
*F02D 41/04* (2006.01)
(Continued)

(52) U.S. Cl.
CPC .............. *F02D 41/042* (2013.01); *B60K 6/48* (2013.01); *B60W 10/02* (2013.01); *B60W 10/06* (2013.01);
(Continued)

(58) Field of Classification Search
CPC .......................... B60W 20/16; F02D 41/042
(Continued)

(56) References Cited

U.S. PATENT DOCUMENTS 6,135,920 A * 10/2000 Kamiya ................ B60W 10/06
477/185
6,321,530 B1    11/2001 Hoshi et al.
(Continued)

FOREIGN PATENT DOCUMENTS

CN        1497156 A     5/2004
CN      101959735 A     1/2011
(Continued)

*Primary Examiner* — Jacob S. Scott
*Assistant Examiner* — Michael E Butler
(74) *Attorney, Agent, or Firm* — Drinker Biddle & Reath LLP

(57) ABSTRACT

An internal combustion engine of a hybrid drive vehicle includes an exhaust gas purification catalyst in an exhaust passage. An internal combustion engine control device is configured to continuously rotate the internal combustion engine for a predetermined time period after an engine start. The internal combustion engine control device prohibits a fuel-cut within the predetermined time period after the engine start, thereby suppressing the frequent repetition of the start and stop of the internal combustion engine due to an accelerator pedal operation and suppressing oxygen storage in the exhaust gas purification catalyst associated with the fuel-cut. As a result, exhaust gas purification performance at the time of restarting the internal combustion engine is ensured.

5 Claims, 3 Drawing Sheets

(51) Int. Cl.
*B60W 20/20* (2016.01)
*B60K 6/48* (2007.10)
*B60W 10/06* (2006.01)
*F02D 29/02* (2006.01)
*B60W 10/02* (2006.01)
*B60W 10/08* (2006.01)
*B60W 20/40* (2016.01)
*F02N 11/08* (2006.01)

(52) U.S. Cl.
CPC ............ *B60W 10/08* (2013.01); *B60W 20/16* (2016.01); *B60W 20/20* (2013.01); *B60W 20/40* (2013.01); *F02D 29/02* (2013.01); *F02N 11/0814* (2013.01); *B60K 2006/4825* (2013.01); *B60W 2510/06* (2013.01); *B60W 2710/06* (2013.01); *F01N 2430/00* (2013.01); *F01N 2590/11* (2013.01); *F01N 2900/08* (2013.01); *F01N 2900/1624* (2013.01); *Y02T 10/48* (2013.01); *Y02T 10/54* (2013.01); *Y02T 10/6221* (2013.01); *Y02T 10/6252* (2013.01); *Y10S 903/905* (2013.01); *Y10S 903/93* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 6,434,453 B1* | 8/2002 | Kuroda | ................. | B60K 6/485 701/22 |
| 6,763,903 B2* | 7/2004 | Morimoto | ............. | B60K 6/485 180/65.26 |
| 8,018,382 B2* | 9/2011 | Shore | ............... | E21B 47/02224 342/386 |
| 8,280,599 B2* | 10/2012 | Suzuki | ................. | B60W 10/06 477/115 |
| 2001/0020789 A1* | 9/2001 | Nakashima | ............. | B60K 6/48 290/40 C |
| 2002/0074173 A1 | 6/2002 | Morimoto et al. | | |
| 2002/0092295 A1 | 7/2002 | Suzuki et al. | | |
| 2004/0060535 A1 | 4/2004 | Osawa et al. | | |
| 2004/0106500 A1* | 6/2004 | Ayabe | ................... | F16H 61/061 477/117 |
| 2006/0218894 A1 | 10/2006 | Miwa et al. | | |
| 2009/0043437 A1* | 2/2009 | Shiino | ..................... | B60K 6/48 701/22 |
| 2009/0171538 A1* | 7/2009 | Kadota | .................. | B60K 6/485 701/51 |
| 2010/0075798 A1* | 3/2010 | Suzuki | ..................... | B60K 6/40 477/5 |
| 2011/0288702 A1* | 11/2011 | Falkestein | ............. | B60W 10/06 701/22 |
| 2012/0016538 A1* | 1/2012 | Waite | ..................... | G01C 21/20 701/3 |
| 2012/0199437 A1* | 8/2012 | Okuda | ..................... | B60K 6/48 192/85.63 |
| 2013/0310217 A1* | 11/2013 | Terakawa | ................. | B60K 6/48 477/5 |
| 2016/0083084 A1* | 3/2016 | Wang | ..................... | B64C 39/024 244/17.23 |

FOREIGN PATENT DOCUMENTS

| | | |
|---|---|---|
| EP | 1920985 A1 | 5/2008 |
| EP | 2277757 A2 | 1/2011 |
| JP | H04-272438 A | 9/1992 |
| JP | 2002-285878 A | 10/2002 |
| JP | 2002-303129 A | 10/2002 |
| JP | 2004-225539 A | 8/2004 |
| JP | 2007-083796 A | 4/2007 |
| JP | 2009-041403 A | 2/2009 |
| JP | 2010-143423 A | 7/2010 |
| RU | 2 319 021 C2 | 10/2007 |
| RU | 2 380 240 C1 | 1/2010 |
| WO | WO 2011/024038 A2 | 3/2011 |

\* cited by examiner

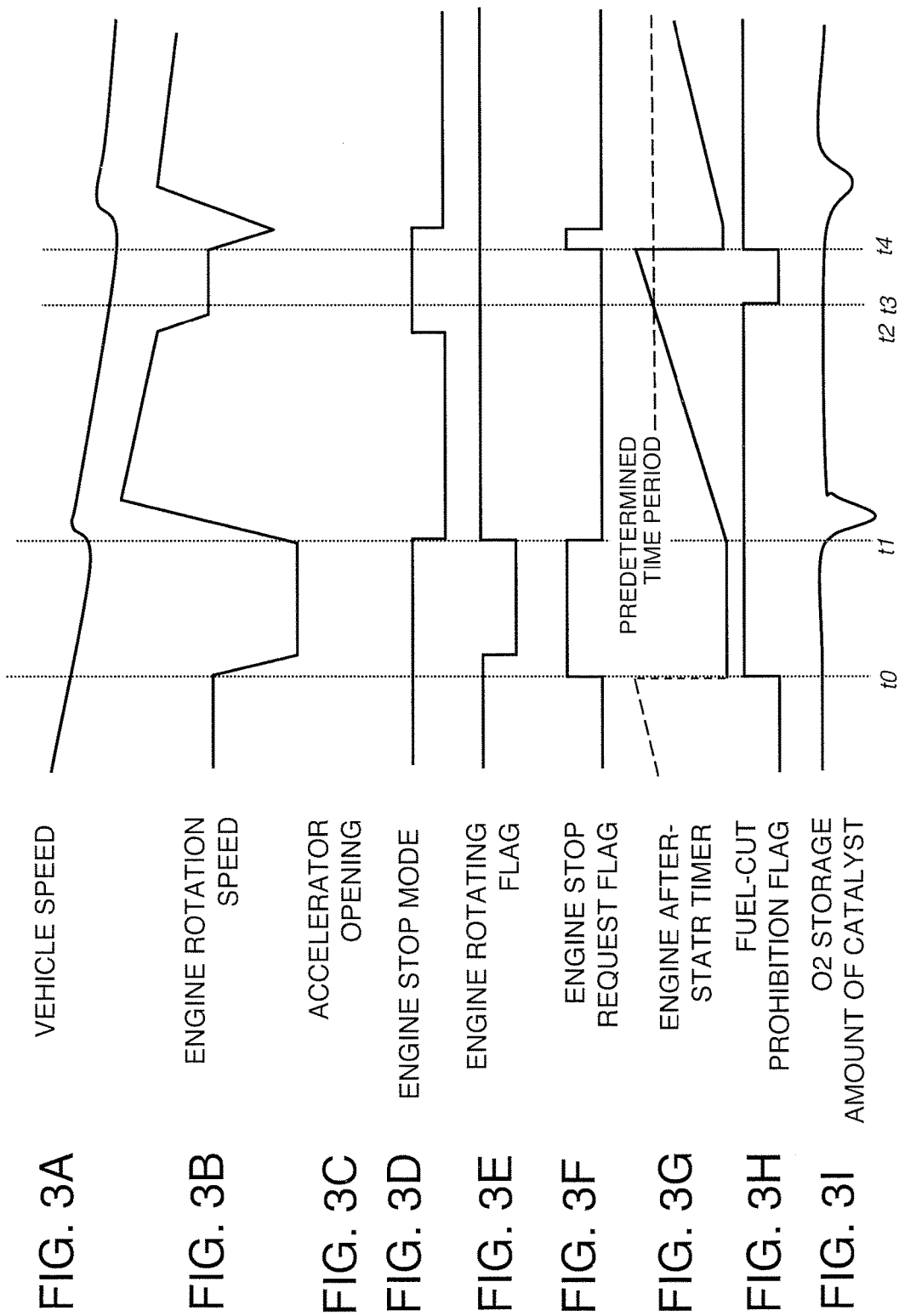

ically, there are an EV
CONTROL DEVICE AND CONTROL METHOD FOR HYBRID DRIVE VEHICLE

TECHNICAL FIELD

This invention relates to a start control of an internal combustion engine in a hybrid drive vehicle using both an electric motor and the internal combustion engine.

BACKGROUND ART

In a hybrid drive vehicle in which an electric motor and an internal combustion engine are connected by a clutch and power of the internal combustion engine is used in addition to that of the electric motor to drive the vehicle in response to a torque request, two types of travel modes are, for example, selectively applied. Specifically, there are an EV travel mode for travel using only power of the electric motor and an HEV mode for travel using power of both the electric motor and the internal combustion engine.

The EV mode and the HEV mode are determined, for example, based on a depression amount of an accelerator pedal. Specifically, the vehicle travels in the EV mode if the depression amount of the accelerator pedal is not higher than a threshold value while traveling in the HEV mode if the depression amount of the accelerator pedal is higher than the threshold value. In switching from EV mode traveling to HEV mode traveling, the clutch is connected and the electric motor activates the internal combustion engine by cranking the internal combustion engine. Disengaging the clutch makes a switch from the HEV mode to the EV mode.

If the operation of the internal combustion engine is stopped in the switch from the HEV mode to the EV mode, the start and stop of the internal combustion engine are frequently made when the depression amount of the accelerator pedal varies near the threshold value and a driver may feel uncomfortable.

JP2010-143423A, published in 2010 by the Japan Patent Office, proposes a control to alleviate such a hunting phenomenon. According to this prior art, a start or stop of an internal combustion engine is prevented if a depression amount of an accelerator pedal changes in an opposite direction and reaches a threshold value immediately after the start or stop of the internal combustion engine is requested.

SUMMARY OF INVENTION

However, even by this control, the internal combustion engine is started or stopped if the depression amount of the accelerator pedal varies beyond the threshold value. Accordingly, the start and stop of the internal combustion engine are made with a high frequency if such a variation of the depression amount of the accelerator pedal across the threshold value is frequently made.

It is therefore an object of this invention to avoid frequent repetition of the start and stop of an internal combustion engine in a hybrid drive vehicle.

To achieve the above object, this invention provides control device for a hybrid drive vehicle. The hybrid drive vehicle comprises an internal combustion engine that comprises an exhaust passage and an exhaust gas purification catalyst having an oxygen storage function and provided in the exhaust passage. The hybrid drive vehicle selectively switches an EV mode for travel using only a drive power of an electric motor and an HEV mode for travel using both a drive power of the internal combustion engine and the drive power of the electric motor. The hybrid drive vehicle performs a fuel-cut to the internal combustion engine when a requested load to the internal combustion engine becomes zero while the HEV mode is selected.

The control device comprises a rotating mechanism which continuously rotates the internal combustion engine for a predetermined time period after an engine start and a prohibiting mechanism which prohibits the fuel-cut within the predetermined time period.

The details as well as other features and advantages of this invention are set forth in the remainder of the specification and are shown in the accompanying drawings.

BRIEF DESCRIPTION OF DRAWINGS

FIGS. 3A to 3I are timing charts showing execution results of the control routine.

DESCRIPTION OF EMBODIMENT

Figure 1:
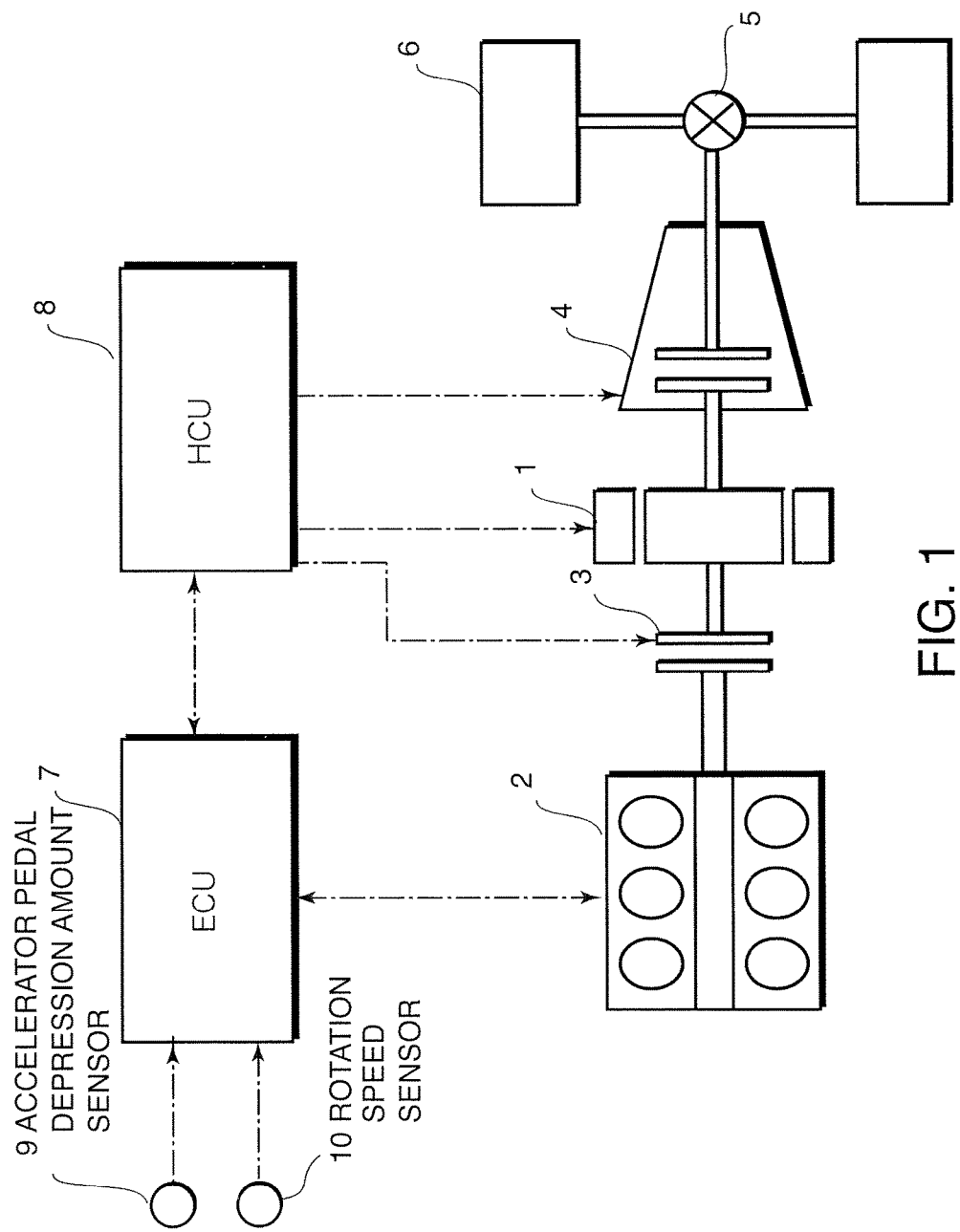
FIG. 1 is a schematic diagram of a hybrid drive vehicle and control device according to an embodiment of this invention.

Referring to FIG. 1 of the drawings, a hybrid drive vehicle comprises an electric motor 1 and an internal combustion engine 2 as travel power sources.

The electric motor 1 is connected to two drive wheels 6 of the hybrid drive vehicle via a transmission mechanism 4 composed of an automatic transmission and a clutch and a differential 5.

The internal combustion engine 2 is connected to the electric motor 1 via a clutch 3. An exhaust gas purification catalyst having an oxygen ($O_2$) storage function such as a three-way catalyst is disposed in an exhaust passage of the internal combustion engine 2 to remove toxic components in exhaust gas.

When the clutch 3 is disengaged, the hybrid drive vehicle travels by rotating the drive wheels 6 by a drive torque of the electric motor 1. This travel mode is referred to as an EV mode.

On the other hand, when the clutch 3 is engaged, the internal combustion engine 2 is cranked and fuel is supplied to the internal combustion engine 2, whereby the internal combustion engine 2 starts to operate. The internal combustion engine 2 after the start inputs the drive torque to the electric motor 1 via the clutch 3. As a result, the two drive wheels 6 are rotated by a total torque of the drive torque of the internal combustion engine 2 and that of the electric motor 1. A travel mode of the hybrid drive vehicle in this state is referred to as an HEV mode.

If a transmission mode of the automatic transmission is an automatic transmission mode, i.e. a D-range, the EV mode and the HEV mode are switched according to a travel load request of the vehicle. Herein, a depression amount of an accelerator pedal provided in the vehicle is used as the travel load request of the vehicle. Basically, the vehicle travels in the EV mode if the depression amount of the accelerator pedal is not greater than a predetermined threshold value while traveling in the HEV mode if the depression amount of the accelerator pedal is greater than the predetermined threshold value.

On the other hand, if the transmission mode of the automatic transmission is a manual transmission mode, i.e.

a mode in which a driver can select a gear position by operating a shift switch, the vehicle basically travels in the HEV mode.

The travel of the vehicle is controlled by a hybrid control unit (HCU) 8. The operation of the internal combustion engine 2 is controlled by an engine control unit (ECU) 7.

Each of the ECU 7 and the HCU 8 is constituted by a microcomputer comprising a central processing unit (CPU), a read only memory (ROM), a random access memory (RAM) and an input/output interface (I/O interface). It is also possible to constitute the ECU 7 by a plurality of microcomputers. It is also possible to constitute the HCU 8 by a plurality of microcomputers. Alternatively, it is also possible to constitute the ECU 7 and the HCU 8 by a single microcomputer.

For controlling switch between the HEV mode and the EV mode, an accelerator pedal depression amount sensor 9 that detects the depression amount of the accelerator pedal is connected to the HCU 8. A rotation speed sensor 10 that detects a rotation speed of the internal combustion engine 2 is connected to the ECU 7.

The HCU 8 selectively applies the HEV mode and the EV mode according to travel conditions including the depression amount of the accelerator pedal. The HCU 8 also outputs an engine start request and an engine stop request to the ECU 7. The ECU 7 controls the operation of the internal combustion engine 2 according to a request signal input from the HCU 8.

The HCU 8 further controls an engagement and disengagement of the clutch 3, the operation of the electric motor 1, and a shift control of the automatic transmission and an engagement and disengagement of the clutch of the transmission mechanism 4.

As described above, the driver may feel uncomfortable if the start and stop of the internal combustion engine 2 are frequently repeated in association with the switch between the HEV travel mode and the EV travel mode. Accordingly, the HCU 8 is programmed to continue the rotation of the internal combustion engine 2 without disengaging the clutch 3 during a predetermined time period after the start of the internal combustion engine 2 even if a requested torque decreases. In the following description, this predetermined time period is referred to as a first predetermined time period.

On the other hand, the ECU 7 controls the operation of the internal combustion engine 2 in the HEV mode based on the requested torque input from the HCU 8. Specifically, a fuel injection amount, an injection timing and an ignition timing of the internal combustion engine 2 are controlled. A fuel-cut is executed if the requested torque is zero in the HEV mode. Further, the start of the internal combustion engine 2 during an operation stop and the stop of the internal combustion engine 2 in operation are made according to an engine start request and an engine stop request input from the HCU 8.

It should be noted that if the driver releases the accelerator pedal when the transmission mode of the automatic transmission is the automatic transmission mode and the vehicle travels in the HEV mode, a switch is made from the HEV mode to the EV mode to stop the operation of the internal combustion engine 2. In contrast, if the driver releases the accelerator pedal and the requested torque becomes zero when the transmission mode of the automatic transmission is the manual transmission mode, the fuel-cut is executed while the HEV mode is maintained.

During the predetermined time period after the start of the internal combustion engine 2, the HCU 8 maintains an engaged state of the clutch 3 and causes the internal combustion engine 2 to continue to rotate. Specifically, the HEV mode is maintained during the predetermined time period after the start of the internal combustion engine 2. If the driver releases the accelerator pedal during this predetermined time period, the torque request to the internal combustion engine 2 input from the HCU 8 to the ECU 7 disappears. Accordingly, the fuel-cut is normally executed, but exhaust gas becomes lean and oxygen is stored in the exhaust gas purification catalyst in the exhaust passage if the fuel-cut is executed in this state. Further, if a released state of the accelerator pedal continues, the internal combustion engine 2 stops in a state where oxygen is stored in the exhaust gas purification catalyst.

If the internal combustion engine 2 resumes combustion in the state where oxygen is stored in the exhaust gas purification catalyst, purification by oxidation of hydrocarbon (HC) and carbon monoxide (CO) by oxygen stored in the exhaust gas purification catalyst is satisfactorily performed, whereas purification by reduction of nitride oxides (NOx) is affected due to the absence of reducing agent. As a result, the deterioration of exhaust emission is unavoidable.

Figure 2:
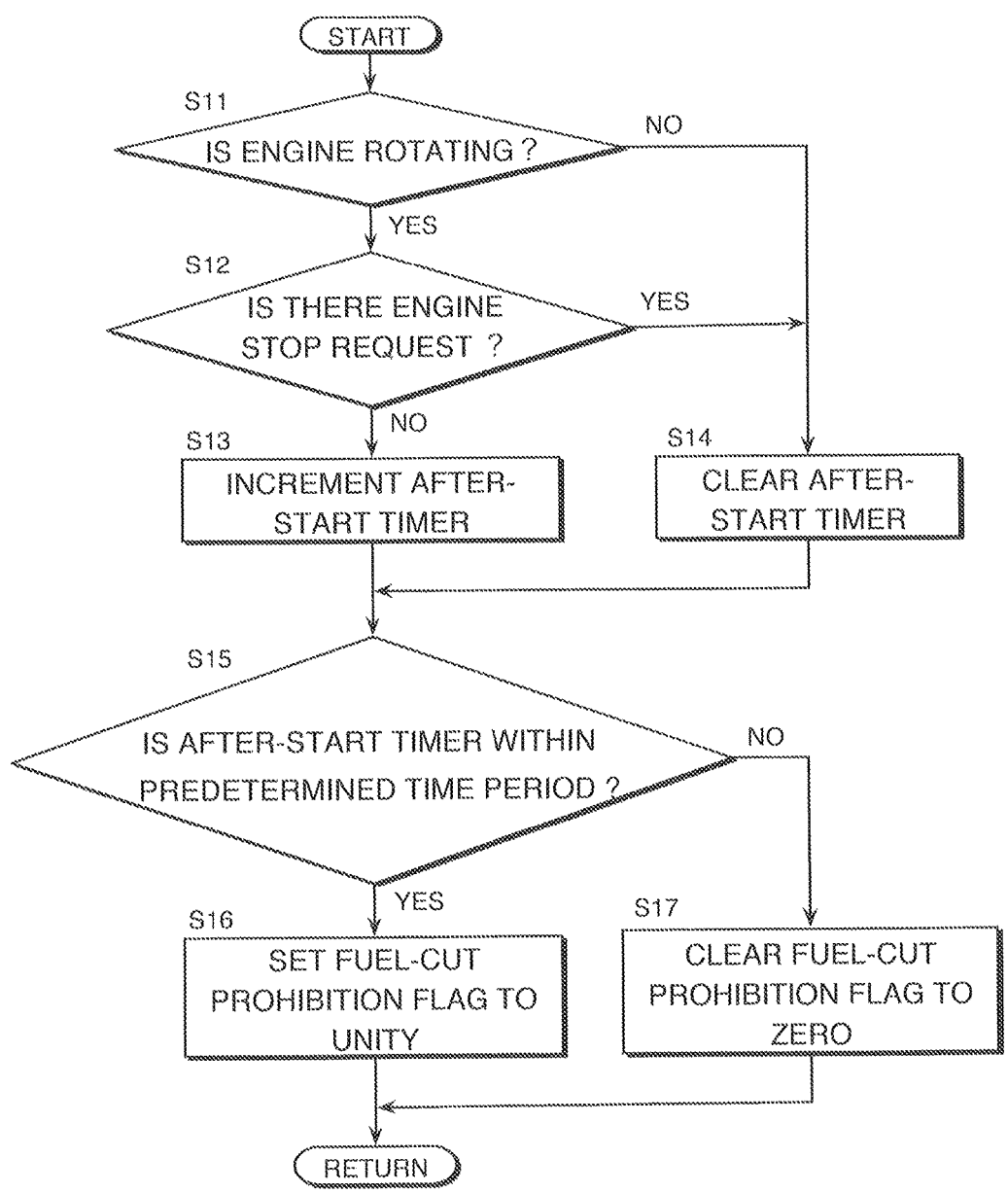
FIG. 2 is a flow chart describing a control routine of the internal combustion engine executed by an engine controller according to the embodiment of this invention.

To prevent such deterioration of exhaust emission at the time of resuming the combustion of the internal combustion engine 2, the ECU 7 executes a fuel-cut prohibition routine shown in FIG. 2, thereby preventing an atmosphere of the exhaust gas purification catalyst from becoming lean.

This fuel-cut prohibition routine is repeatedly executed at a constant time interval of, e.g. ten milliseconds in a state where a main switch of the hybrid drive vehicle is on.

Referring to FIG. 2, the ECU 7 determines whether or not the internal combustion engine 2 is in rotation based on an input signal from the rotation speed sensor 10 in a step S11.

Unless the internal combustion engine 2 is in rotation, i.e. if the rotation of the internal combustion engine 2 is stopped, the ECU 7 resets an after-start timer in a step S14 and performs a processing of a step S15. Herein, the after-start timer is a timer that starts to count simultaneously with the start of the internal combustion engine 2 and measures an elapsed time from the start.

If the internal combustion engine 2 is in rotation, the ECU 7 determines the presence or absence of a stop request of the internal combustion engine 2 in a step S12. The stop request of the internal combustion engine 2 is a request output from the HCU 8. This request is output from the HCU 8 to the ECU 7, for example, when the travel mode is switched from the HEV mode to the EV mode.

In the presence of the stop request of the internal combustion engine 2 as a result of the determination of the step S12, the ECU 7 clears the after-start timer in the step S14 and performs the processing of the step S15. In the absence of the stop request of the internal combustion engine 2 as a result of the determination of the step S12, the ECU 7 increments the after-start timer in a step S13 and performs the processing of the step S15.

In, the step S15, the ECU 7 determines whether or not the value of the after-start timer is within a predetermined time period. This predetermined time period is referred to as second predetermined time period in the following description. In this embodiment, the value of the second predetermined time period is set to be greater than that of the first predetermined time period.

If the determination of the step S15 is affirmative, the ECU 7 sets a fuel-cut prohibition flag to unity in a step S16 and terminates the routine. If the determination of the step S15 is negative, the ECU 7 resets the fuel-cut prohibition flag to zero in a step S17 and terminates the routine.

The ECU 7 does not execute the fuel-cut and continues to supply a predetermined amount of fuel to the internal combustion engine 2 even if the requested torque to the internal combustion engine 2 input from the HCU 8 is zero as long as the fuel-cut prohibition flag is at unity. On the other hand, if the fuel-cut prohibition flag is at zero, the fuel-cut is executed for the internal combustion engine 2 if the requested torque to the internal combustion engine 2 input from the HCU 8 is zero.

By executing the above routine, if the internal combustion engine 2 has started operation, the fuel-cut is prohibited regardless of the requested torque to the internal combustion engine 2 until the second predetermined time period elapses from the engine start.

Referring to FIGS. 3A to 3I now, results brought by the execution of the fuel-cut prohibition routine will be described.

In FIGS. 3A to 3I, the hybrid drive vehicle connects the electric motor 1 and the internal combustion engine 2 by the clutch 3 and travels in the HEV mode using power of both the electric motor 1 and the internal combustion engine 2 until time t0. An engine stop request is output from the HCU 8 to the ECU 7 at time t0 and a transition is made from the HEV mode to the EV mode.

The transition from the HEV mode to the EV mode is made under the following process. First, prior to time t0, an engine stop advance notice is input from the HCU 8 to the ECU 7. Associated with the advance notice, preparations such as the disengagement of the clutch 3 by the HCU 8 and the setting of a most retarded valve timing of the internal combustion engine 2 by the ECU 7 are made for an operation stop. When the operation stop preparations are completed, an engine stop enabling signal is output from the ECU 7 to the HCU 8. In response to the engine stop enabling signal, the HCU 8 outputs the engine stop request to the ECU 7 at time t0 and the ECU 7 immediately stops fuel supply to the internal combustion engine 2. The internal combustion engine 2 stops rotating with a slight delay from time t0.

Meanwhile, the ECU 7 repeatedly executes the fuel-cut prohibition routine of FIG. 2 also during this time. If the engine stop request is present even when the rotation of the engine is not stopped, the determination of the step S12 is affirmative and the after-start timer is cleared in the step S14. As a result, the determination of the step S15 is affirmative and the fuel-cut prohibition flag is set to unity in the step S16.

In the state where the rotation of the internal combustion engine 2 is stopped, the determination of the step S11 is negative. As a result, the after-start timer is cleared in the step 14 without reaching the determination of the step S12 and the determination of the step S15 becomes constantly affirmative. Thus, the fuel-cut prohibition flag continues to be at unity in the step S16 also while the rotation of the internal combustion engine 2 is stopped. However, since the engine stop request by the HCU 8 is prioritized over the fuel-cut prohibition flag set by the ECU 7, the ECU cuts the supply of the fuel to stop the operation of the internal combustion engine 2 as long as the engine stop request is valid even if the fuel-cut prohibition flag is at unity.

The after-start timer is immediately cleared in the step S14 in response to the engine stop request for the following reason. Unless the after-start timer is cleared in response to the engine stop request, the after-start timer continues to be incremented during a period from the engine stop request to the stop of the rotation of the internal combustion engine 2. If the accelerator pedal is depressed during this period, the internal combustion engine 2 is restarted without resetting the after-start timer. As a result, there is a possibility that the after-start timer reaches the second predetermined time period immediately thereafter and the fuel-cut prohibition flag is cleared in the step S17. If the accelerator pedal is released in this state, the fuel-cut is executed since the fuel-cut prohibition flag is cleared. As a result, the exhaust gas becomes lean due to fuel-cut rotation of the internal combustion engine 2 and oxygen is stored in the exhaust gas purification catalyst in the exhaust passage. The stored oxygen unfavorably affects exhaust gas purification performance at the time of resuming the combustion of the internal combustion engine 2 and causes the deterioration of exhaust emission.

That is, unless the after-start timer is reliably cleared when the internal combustion engine 2 is restarted, an effect of preventing the deterioration of exhaust emission by preventing the fuel-cut rotation of the internal combustion engine 2 cannot be sufficiently obtained. Accordingly, by keeping the after-start timer in a cleared state while the engine stop request is valid, the after-start timer invariably starts counting from zero even if the internal combustion engine 2 is restarted before the stop of the rotation is reached.

If the accelerator pedal is depressed during the travel in the EV mode, the clutch 3 is engaged at a time t1 and the internal combustion engine 2 is cranked. Simultaneously, the engine stop request disappears. After the start of the cranking, the determination of the step S11 becomes affirmative since the internal combustion engine 2 is in rotation and the determination of the step S12 is negative since the engine stop request is absent. As a result, the increment of the after-start timer in the step S13 is started.

Immediately after the increment of the after-start timer is started, the determination of the step S15 is affirmative. Accordingly, the fuel-cut prohibition flag is maintained at unity. As a result, fuel is supplied to the internal combustion engine 2 and the internal combustion engine 2 starts to operate. After the start of the internal combustion engine 2, the hybrid drive vehicle travels in the HEV mode.

If the accelerator pedal is released during the travel in the HEV mode, the requested torque to the internal combustion engine 2 input from the HCU 8 to the ECU 7 becomes zero. In this case, fuel supply to the internal combustion engine 2 is normally cut.

However, in the course of the repeated execution of the fuel-cut prohibition routine, the determination of the step S15 is affirmative during a period from the time t1 at which the internal combustion engine 2 is started to a time t3 at which the elapsed time period after the engine start reaches the second predetermined time period. As a result, a state where the fuel-cut prohibition flag is at unity continues. Thus, the ECU 7 continues to supply a minimum amount of fuel to the internal combustion engine 2 regardless of the requested torque to the internal combustion engine 2.

It should be noted that a throttle of the internal combustion engine 2 at this time is controlled to have such an opening at which a predetermined minimum air amount is supplied according to the rotation speed of the internal combustion engine 2. In combination with this minimum air amount, a minimum amount of fuel to prevent the exhaust gas from becoming lean is supplied to the internal combustion engine 2. Further, the vehicle is in deceleration at this time and the value of a negative torque of the internal combustion engine 2 is smaller when the fuel-cut is prohibited than when the fuel-cut is executed. Accordingly, a regenerative torque of the electric motor 1 is caused to increase when the fuel-cut is prohibited. This enables the same vehicle deceleration to be obtained both when the fuel-cut is prohibited and when the fuel-cut is executed.

When the vehicles comes to a stop from a decelerating state, the HCU 8 weakens an engaging force of the clutch of the transmission mechanism 4 to set the clutch in a sleep state while maintaining the engaged state of the clutch 3, thereby preventing an engine stall. When the vehicle stops, the throttle of the internal combustion engine 2 is controlled to have an opening equivalent to an air amount corresponding to a predetermined target idle rotation speed according to a cooling water temperature of the internal combustion engine 2. Further, a minimum amount of fuel to prevent the exhaust gas from becoming lean is supplied to the internal combustion engine 2.

If the accelerator pedal is released immediately after the time t1 and the requested torque to the internal combustion engine 2 becomes zero, the fuel-cut is normally executed. However, since the after-start timer is within the second predetermined time period in the step S15 in this control device, the fuel-cut prohibition flag is maintained at unity in the step S16 and the fuel-cut is not executed.

At a time t2 at which the elapsed time period after the start of the internal combustion engine 2 reaches the first predetermined time period, the engine stop advance notice is input from the HCU 8 to the ECU 7. Simultaneously, the HCU 8 disengages the clutch 3. This means that a control to continue the rotation for the first predetermined time period after the start of the internal combustion engine 2 is finished at the time t2. At this time t2, the after-start timer has not reached the second predetermined time period yet. Thus, the fuel-cut continues to be prohibited in the disengaged state of the clutch 3 and the internal combustion engine 2 continues to be operated by the supplied fuel. The rotation speed of the internal combustion engine 2 becomes an idle rotation speed due to the disengagement of the clutch 3. In this state, the ECU 7 performs an operation stop preparation operation such as the setting of the most retarded valve timing of the internal combustion engine 2. It should be noted that the fuel-cut is prohibited for the second predetermined time period to prevent the fuel-cut rotation of the internal combustion engine 2 in the engaged state of the clutch 3. This condition is met unless the second predetermined time period falls below the first predetermined time period. Thus, the second predetermined time period can be set equal to the first predetermined time period.

When the after-start timer reaches the second predetermined time period at the time t3, the determination of the step S15 changes to be negative and the fuel-cut prohibition flag is cleared to zero in the step S17. However, since the internal combustion engine 2 is in an operation stop preparation at this time, the fuel-cut is not executed and the idle operation of the internal combustion engine 2 is maintained.

At a time t4 at which the operation stop preparation operation is completed, an engine stop enabling signal is output from the ECU 7 to the HCU 8. In response to the engine stop enabling signal, the HCU 8 outputs the engine stop request to the ECU 7 at the time t4. The ECU 7 having received the engine stop request immediately stops fuel supply to the internal combustion engine 2 and the internal combustion engine 2 stops rotating. It should be noted that the determination of the step S12 changes to be affirmative due to the engine stop request and the after-start timer is cleared in the step S14. As a result, the fuel-cut prohibition flag is set to unity in the step S16. The fuel-cut prohibition flag is maintained at unity until the second predetermined time period elapses after the internal combustion engine 2 is restarted.

Thereafter, when the accelerator pedal is depressed again, the clutch 3 is engaged and the internal combustion engine 2 is started as in the process at the time t1. Thereafter, the fuel-cut is prohibited regardless of a variation of the requested torque until the second predetermined time period elapses.

As described above, this control device continuously rotates the internal combustion engine 2 without disengaging the clutch 3 for the second predetermined time period after the start of the internal combustion engine 2 while prohibiting the fuel-cut within the second predetermined time period. Thus, the rotation of the internal combustion engine 2 is not stopped and, further, the internal combustion engine 2 does not perform the fuel-cut rotation, i.e. not rotated in the fuel-cut state, within the second predetermined time period.

As a result, uncomfortable feeling that the driver experiences due to frequent repetition of the start and stop of the internal combustion engine 2 according to a variation of the requested torque can be eliminated. Further, since the fuel-cut is prohibited within the second predetermined time period after the start of the internal combustion engine 2, the storage of oxygen in the exhaust gas purification catalyst caused by the fuel-cut rotation of the internal combustion engine 2 can also be prevented. Thus, a problem of deteriorating exhaust emission at the time of resuming combustion of the internal combustion engine 2 can also be prevented.

It should be noted that if the driver releases the accelerator pedal in a state where the transmission mode of the automatic transmission is the manual transmission mode, the fuel-cut is normally executed, the internal combustion engine 2 performs the fuel-cut rotation and oxygen is stored in the exhaust gas purification catalyst. The normal fuel-cut is finished when the rotation speed of the internal combustion engine 2 falls to a recovery rotation speed, fuel supply to the internal combustion engine 2 is resumed and the internal combustion engine 2 resumes combustion. At this time, the atmosphere of the exhaust gas purification catalyst is quickly returned to the one equivalent to a stoichiometric air-fuel ratio by executing a so-called rich spike of temporarily increasing the fuel injection amount. By this rich spike, the deterioration of exhaust emission at the time of resuming the combustion of the internal combustion engine 2 can be prevented.

However, if the fuel-cut is permitted in a state where the control to continuously rotate the internal combustion engine 2 for the first predetermined time period after the start is executed, the operation of the internal combustion engine 2 is stopped in a state where oxygen is stored in the exhaust gas purification catalyst due to the fuel-cut rotation of the internal combustion engine 2. This causes the following problem.

Since the rotation speed of the internal combustion engine 2 at the time of resuming combustion is maintained at the recovery rotation speed in the case of the normal fuel-cut, an exhaust gas flow rate is high and the atmosphere of the exhaust gas purification catalyst can be quickly returned to the one equivalent to the stoichiometric air-fuel ratio by executing the rich spike for a short time. However, if the operation of the internal combustion engine 2 is stopped in the state where oxygen is stored in the exhaust gas purification catalyst, there is a possibility of resuming combustion under a condition that the exhaust gas flow rate is a minimum. Under such a condition, it takes time to return the atmosphere of the exhaust gas purification catalyst to the one equivalent to the stoichiometric air-fuel ratio even if the rick spike is executed. As a result, the deterioration of exhaust emission during that period is unavoidable. Thus, in the case of executing the control to continuously rotate the internal combustion engine 2 for the first predetermined after the start, it is effective in preventing the deterioration of exhaust emission to prohibit the fuel-cut at least during that period.

The control device for the hybrid drive vehicle described above detects a load of the vehicle by the accelerator pedal depression amount sensor 9, and the ECU 7 calculates a requested load to the internal combustion engine 2 based on the load and executes the fuel-cut of the internal combustion engine 2 based on the requested load. Thus, the fuel-cut can be easily prohibited based on the fuel-cut prohibition flag.

The control device for the hybrid drive vehicle described above starts the electric motor 1 and travels in the HEV mode by connecting the electric motor 1 and the internal combustion engine 2 via the clutch 3 and maintaining the clutch 3 in the engaged state. Thus, if the fuel-cut is executed in the engaged state of the clutch 3, the internal combustion engine 2 easily rotates in the fuel-cut state and oxygen is easily stored in the exhaust gas purification catalyst. On the other hand, the fuel-cut rotation of the internal combustion engine 2 can be reliably prevented by prohibiting the fuel-cut within the second predetermined time period after the start of the internal combustion engine 2. In other words, this invention provides a best effect by being applied to the hybrid drive vehicle thus configured.

In the control device for the hybrid drive vehicle described above, the HCU 8 constitutes a rotating means and an engagement maintaining means and the ECU 7 constitutes a prohibiting means and an after-start timer.

The contents of Tokugan 2012-009009, with a filing date of Jan. 19, 2012 in Japan, are hereby incorporated by reference.

Although the invention has been described above with reference to a certain embodiment, the invention is not limited to the embodiment described above. Modifications and variations of the embodiment described above will occur to those skilled in the art, within the scope of the claims.

INDUSTRIAL FIELD OF APPLICATION

As described above, this invention provides favorable effects of suppressing the frequent repetition of the start and stop of an internal combustion engine due to an accelerator pedal operation and preventing the deterioration of exhaust gas purification performance in a hybrid drive vehicle using both the internal combustion engine and an electric motor.

The embodiments of this invention in which an exclusive property or privilege is claimed are defined as follows:

The invention claimed is:

1. A control device for a hybrid drive vehicle, the hybrid drive vehicle comprising an internal combustion engine that comprises an exhaust passage and an exhaust gas purification catalyst having an oxygen storage function and provided in the exhaust passage, an electric motor, and a clutch interposed between the internal combustion engine and the electric motor to apply an EV mode for travel using only a drive power of the electric motor in a disengaged state and an HEV mode for travel using both a drive power of the internal combustion engine and the drive power of the electric motor in an engaged state, the device comprising:
a programmable controller programmed to:
perform a fuel-cut to the internal combustion engine when a requested load to the internal combustion engine becomes zero while the HEV mode is applied;
cause the electric motor to start the internal combustion engine by engaging the clutch;
maintain the clutch in the engaged state for a first predetermined time period after the internal combustion engine is started; and
prohibit the fuel-cut from being performed within a second predetermined time period that is greater than the first predetermined time period.

2. The control device according to 1, further comprising an after-start timer which is reset when the rotation of the internal combustion engine is stopped and incremented when the internal combustion engine is in rotation;
wherein the controller is further programmed to prohibit the fuel-cut until the value of the after-start timer becomes equal to or greater than the second predetermined time period.

3. The control device according to 2, wherein the controller is constituted by a hybrid control unit programmed to control the operation of the hybrid drive vehicle and an engine control unit programmed to control the operation of the internal combustion engine, and
wherein the hybrid control unit is programmed to output an engine stop request to the engine control unit when the EV mode is to be applied and the engine control unit is programmed to reset the after-start timer when the engine stop request is output from the hybrid control unit.

4. A control device for a hybrid drive vehicle, the hybrid drive vehicle comprising an internal combustion engine that comprises an exhaust passage and an exhaust gas purification catalyst having an oxygen storage function and provided in the exhaust passage, an electric motor, and a clutch interposed between the internal combustion engine and the electric motor to apply an EV mode for travel using only a drive power of the electric motor in a disengaged state and an HEV mode for travel using both a drive power of the internal combustion engine and the drive power of the electric motor in an engaged state, the device comprising:
fuel-cut performing means that performs a fuel-cut to the internal combustion engine when a requested load to the internal combustion engine becomes zero while the HEV mode is applied;
engine starting means that causes the electric motor to start the internal combustion engine by engaging the clutch;
engagement maintaining means that maintains the clutch in the engaged state for a first predetermined time period after the internal combustion engine is started; and
prohibiting means that prohibits the fuel-cut from being performed within a second predetermined time period that is greater than the first predetermined time period.

5. A control method for a hybrid drive vehicle, the hybrid drive vehicle comprising an internal combustion engine that comprises an exhaust passage and an exhaust gas purification catalyst having an oxygen storage function and provided in the exhaust passage, an electric motor, and a clutch interposed between the internal combustion engine and the electric motor to apply an EV mode for travel using only a drive power of the electric motor in a disengaged state and an HEV mode for travel using both a drive power of the internal combustion engine and the drive power of the electric motor in an engaged state, the method comprising:

performing a fuel-cut to the internal combustion engine when a requested load to the internal combustion engine becomes zero while the HEV mode is applied;

causing the electric motor to start the internal combustion engine by engaging the clutch;

maintaining the clutch in the engaged state for a first predetermined time period after the internal combustion engine is started; and prohibiting the fuel-cut from being performed within a second predetermined time period that is greater than the first predetermined time period.

\* \* \* \* \*